(12) United States Patent
Sbongk

(10) Patent No.: US 11,041,520 B2
(45) Date of Patent: Jun. 22, 2021

(54) DEVICE FOR FASTENING A COMPONENT TO A CARRIER COMPONENT

(71) Applicant: ILLINOIS TOOL WORKS INC., Glenview, IL (US)

(72) Inventor: Albert Sbongk, Niederstetten (DE)

(73) Assignee: ILLINOIS TOOL. WORKS INC., Glenview, IL (US)

( * ) Notice: Subject to any disclaimer, the term of this patent is extended or adjusted under 35 U.S.C. 154(b) by 393 days.

(21) Appl. No.: 16/044,995

(22) Filed: Jul. 25, 2018

(65) Prior Publication Data

US 2019/0032696 A1 Jan. 31, 2019

(30) Foreign Application Priority Data

Jul. 27, 2017 (DE) ..................... 10 2017 117 002.2

(51) Int. Cl.
*F16B 21/02* (2006.01)
*F16B 21/08* (2006.01)
*B60R 13/02* (2006.01)

(52) U.S. Cl.
CPC .......... *F16B 21/02* (2013.01); *B60R 13/0206* (2013.01); *B60R 13/0243* (2013.01); *F16B 21/086* (2013.01); *Y10T 403/7005* (2015.01)

(58) Field of Classification Search
CPC ...... F16B 21/02; F16B 21/084; F16B 21/086; F16B 21/04; F16B 5/0621; F16B 5/0642; B60J 5/0468; B60J 5/0469; B60J 5/0416; B60R 13/0206; B60R 13/0243; Y10T 403/7005

See application file for complete search history.

(56) References Cited

U.S. PATENT DOCUMENTS

| 6,237,970 B1 * | 5/2001 | Joannou | E05B 65/006 292/241 |
| 6,612,795 B2 * | 9/2003 | Kirchen | F16B 21/02 24/297 |
| 6,988,863 B2 * | 1/2006 | Hulin | F16B 21/02 411/3 |

(Continued)

FOREIGN PATENT DOCUMENTS

| DE | 19519623 A1 * | 12/1996 | ......... B60R 13/0206 |
| DE | 102006057890 A1 * | 6/2008 | ......... B60R 13/0237 |

(Continued)

*Primary Examiner* — Amber R Anderson
*Assistant Examiner* — Kevin J Baynes
(74) *Attorney, Agent, or Firm* — Thompson Hine LLP

(57) ABSTRACT

A device for fastening a component to a carrier component includes a housing part and a clip part received by the housing part. The clip part is received in the housing part so as to be rotatable between a locking position and an unlocking position. The housing part, with the clip part in the locking position has a pre-mounting position in which first latching means of the housing part latch against the opening in the component. The housing part, with the clip part in the locking position has a final-mounting position in which second latching means of the clip part latch against the opening in the carrier component. The device with clip part in the locking position cannot be released from the carrier component in a linear demounting direction, but can be when the clip part is rotated to the unlocking position.

14 Claims, 4 Drawing Sheets

(56) References Cited

U.S. PATENT DOCUMENTS

| | | | | |
|---|---|---|---|---|
| 7,207,758 | B2* | 4/2007 | Leon | F16B 21/02 |
| | | | | 411/45 |
| 7,222,398 | B2* | 5/2007 | Koike | B62D 27/02 |
| | | | | 24/297 |
| 7,862,275 | B2* | 1/2011 | Jatzke | B60R 13/0206 |
| | | | | 411/45 |
| 8,262,333 | B2* | 9/2012 | Bucker | F16B 21/086 |
| | | | | 411/349 |
| 8,572,818 | B2* | 11/2013 | Hofmann | F16B 21/078 |
| | | | | 24/458 |
| 8,950,043 | B2* | 2/2015 | Hofmann | F16B 5/0664 |
| | | | | 24/297 |
| 9,550,459 | B2* | 1/2017 | Kato | B60R 13/0206 |
| 2007/0253794 | A1* | 11/2007 | Zhang | F16B 21/076 |
| | | | | 411/45 |
| 2008/0219758 | A1* | 9/2008 | Jatzke | F16B 21/18 |
| | | | | 403/282 |
| 2010/0272540 | A1* | 10/2010 | Bucker | F16B 21/02 |
| | | | | 411/549 |
| 2015/0298623 | A1* | 10/2015 | Kato | B60R 13/0206 |
| | | | | 24/458 |
| 2016/0298668 | A1* | 10/2016 | Kanie | F16B 5/0628 |
| 2018/0148003 | A1* | 5/2018 | Hubner | F16B 21/075 |

FOREIGN PATENT DOCUMENTS

| | | | | |
|---|---|---|---|---|
| DE | 202007002704 | | 7/2008 | |
| DE | 202007002704 | U1* | 7/2008 | F16B 5/00 |
| DE | 102015106223 | | 10/2016 | |
| DE | 102015106223 | A1* | 10/2016 | B60R 13/0206 |
| WO | WO-2010034486 | A1* | 4/2010 | F16B 5/065 |
| WO | WO-2012082636 | A1* | 6/2012 | F16B 19/1081 |
| WO | WO-2016171863 | A1* | 10/2016 | B60R 13/0206 |
| WO | WO-2017007543 | A1* | 1/2017 | F16B 21/02 |

* cited by examiner

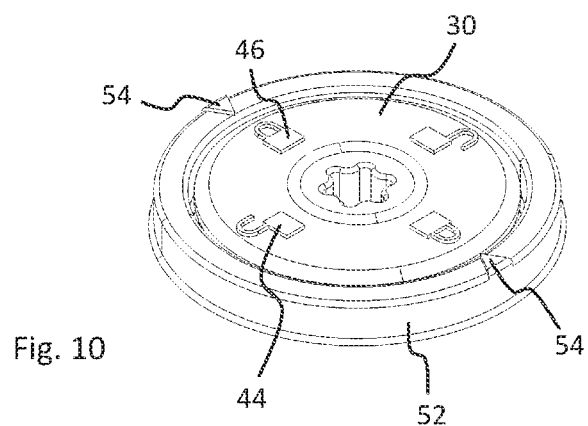
Fig. 10
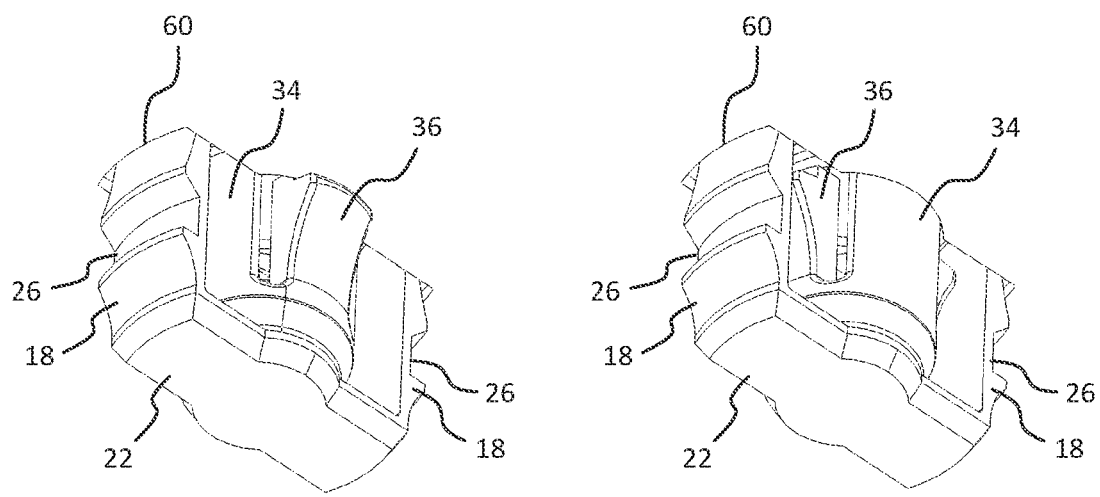
Fig. 11
Fig. 12
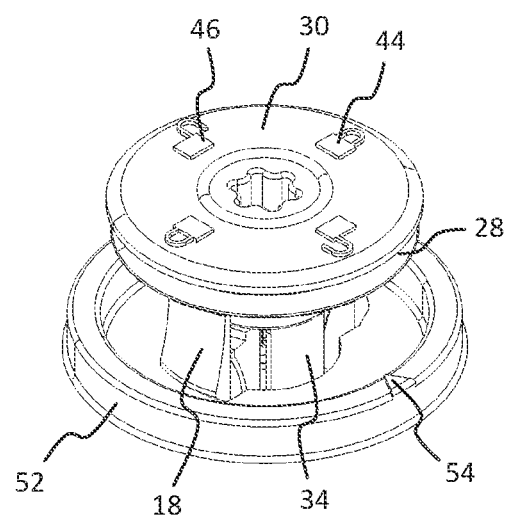
Fig. 13

DEVICE FOR FASTENING A COMPONENT TO A CARRIER COMPONENT

TECHNICAL FIELD

The invention relates to a device for fastening a component to a carrier component, in particular a door module to a vehicle door, comprising a housing part and a clip part received by the housing part, wherein the housing part has first latching means, and wherein the clip part has second latching means.

BACKGROUND

A device for fastening a door module to an automobile door is known for example from DE 10 2015 106 223 A1. The known device comprises a metal clip and a plastic locking body. The metal clip is inserted by an insertion portion into an opening in the door module and into an opening in the automobile door. Here, at least two first latching legs which are attached in a resiliently elastic manner opposite one another to the insertion portion engage behind the opening in the door module. The plastic locking body is inserted into the metal clip, wherein at least two second latching legs which are likewise arranged in a resiliently elastic manner opposite one another on the insertion portion are pressed elastically outward from their inoperative position, with the result that they engage behind the opening in the automobile door. With the plastic locking body fully inserted into the metal clip, a reverse movement of the second latching legs for releasing the engagement behind the automobile door by the plastic locking body is blocked. The known device allows simple mounting by exerting a pressing force along a linear mounting direction. In addition, the device allows demounting by pulling the plastic locking body, which is nonrotatably received in the metal clip, or by pulling the metal clip, out of the automobile door and the door module. At the same time, the device provides very high retaining forces in the mounted state.

U.S. Pat. No. 6,612,795 B2 discloses a further device for fastening a component to a carrier component, in which an oval head portion of the device is guided through an oval opening in the component and, after passing through the opening, is rotated by 90° with respect to the component and the remaining constituent parts of the device. In this way, the device is locked on the component. In addition, the device has a latching portion of latching on the carrier component. A destruction-free demounting of the carrier component is not possible with this device.

DE 20 2007 002 704 U1 discloses a connection element for mechanically connecting at least two components, which connection element can be brought into a pre-mounting position by being pressed into an opening of a door module. For locking against an opening in a carrier component, the connection element is rotated by 90°. However, the known connection element is complicated in design and in terms of mounting.

Taking the explained prior art as a starting point, the object on which the invention is based is to provide a device of the type stated at the outset by means of which a component can be reliably fastened to a carrier component in a structurally simple manner and with simple mounting and demounting.

The invention achieves the object through the subject matter of claim 1. Advantageous embodiments can be found in the dependent claims, the description and the figures.

For a device of the type stated at the outset, the invention achieves the object in that the clip part is received in the housing part so as to be rotatable between a locking position and an unlocking position, in that the housing part, with the clip part received in the locking position, as a result of movement in a linear mounting direction, can be brought into a pre-mounting position in which it is partially inserted into an opening in the component, in which pre-mounting position the first latching means of the housing part latch against the opening in the component, in that the housing part, with the clip part received in the locking position, as a result of further movement in the linear mounting direction, can be brought from the pre-mounting position into a final-mounting position in which it is completely inserted into the opening in the component and into an opening in the carrier component, in which final-mounting position the second latching means of the clip part latch against the opening in the carrier component, with the result that the device with the component cannot be released from the carrier component as a result of movement in a linear demounting direction opposed to the linear mounting direction, and in that the latching of the second latching means of the clip part against the opening in the carrier component is released in the unlocking position of the clip part, with the result that the device with the component can be released from the carrier component as a result of movement in the linear demounting direction.

The component can be a door module. The carrier component can be a vehicle door or a vehicle door part, such as a vehicle door panel. The vehicle can be a passenger car or a truck. Such a door module can hold, for example, loudspeakers or motors for electric window winders of an automobile. However, the door module can also be a door cladding. The door cladding can hold an inner door handle, for example.

The device according to the invention comprises a housing part and a clip part which can be inserted into the housing part. Here, the housing part and the clip part form in particular separate parts. The housing part and/or the clip part can be formed in one piece. The housing part and/or the clip part can consist of plastic, produced for example in a plastic injection-molding process. The housing part can form a cage portion into which the clip part can be introduced by a for example cylindrical or hollow cylindrical insertion portion. The cage portion can have a cylindrical or hollow cylindrical projection at its end facing away from an insertion opening for introducing the clip part, which projection serves for guiding and/or centering the clip part or its insertion portion in the cage portion. A for example hollow cylindrical projection for guiding and/or centering the clip part can also be provided on the end of the clip part that forms the insertion opening.

The component has an opening. The carrier component likewise has an opening. Both openings are not round. For example, they can have an oval shape or keyhole shape. The opening in the carrier component can preferably have a larger cross section than the opening in the component, with the result that, upon assuming the final-mounting position, the first latching means of the housing part do not latch against the opening in the carrier component or can pass through the opening in the carrier component without elastic deformation. The device according to the invention can be delivered to the assembly site with the clip part inserted into the housing part. For this purpose, there can be provided retaining means which releasably retain the clip part in the housing part. These retaining means can be designed for example as latching means.

With the clip part inserted into the housing part and situated in the locking position, the device can first be partially inserted into the opening in the component to reach a pre-mounting position by exerting a linear mounting force along a linear mounting direction and thus a movement along a linear mounting direction. In this pre-mounting position, the housing part is not yet fully pushed into the opening in the component. The housing part can have a first bearing portion which, in the final-mounting position, bears against the component from a side facing away from the carrier component. In the pre-mounting position, this first bearing portion of the housing part does not yet bear against the upper side of the component. The device is held on the component in the pre-mounting position by means of the first latching means of the clip part which latch against the opening of the component. The component can then, with the device pre-mounted thereon, be moved toward the carrier component and positioned relative to the latter, in particular in such a way that the housing part is aligned with the opening of the carrier component.

Then, by further exertion of the linear mounting force along the linear mounting direction and thus further movement of the device along the linear mounting direction, said device, with the housing part leading, can be pushed further through the opening in the component and into the opening in the carrier component to reach the final-mounting position. In this final-mounting position, the device is securely held on the carrier component. For this purpose, use is made of the second latching means of the clip part which, in the final-mounting position, latch against the opening in the carrier component. The component is also securely held on the carrier component by means of the device.

According to the invention, the mounting requires exclusively a linear or translational movement of the device along the mounting direction. This applies both to the assuming of the pre-mounting position and the assuming of the final-mounting position. The mounting is therefore particularly simple. If the device is situated in the final-mounting position, a release of the device from the carrier component requires the prior unlocking of the clip part. For this purpose, the clip part can be rotated in the housing part between the locking position assumed during the mounting and an unlocking position. It must be ensured here that, during this rotation, the housing part does not rotate as well. For this purpose, for example, the geometry of the opening in the carrier component and/or in the component can be designed such that, during a rotation of the clip part in the housing part, the housing part does not rotate as well.

After rotating the clip part into the unlocking position, demounting of the device and thus of the component from the carrier component is possible in a simple manner. Thus, rotating the clip part into the unlocking position releases the latching of the second latching means with the opening in the carrier component. The device, and with it the component, can correspondingly be pulled out of the opening in the carrier component and thus released from the carrier component in a simple manner by exerting a pulling force in a linear demounting direction opposed to the mounting direction. According to the invention, the demounting is achieved in turn exclusively by a movement along the linear demounting direction. The demounting is therefore simple, too. Demounting the device from the component is also possible by exerting a sufficient pulling force along the demounting direction.

The device according to the invention allows simple mounting and demounting. Pre-mounting of the device on the component is possible. At the same time, the device is of structurally simple design and ensures high retaining forces. It is additionally possible, in the pre-mounting position, to minimize the overhang of the device, in particular of the housing part, on the inner side of the component that faces the carrier component. As a result, the mounting is further simplified.

According to a particularly practical embodiment, the clip part can be rotatable between the locking position and the unlocking position by 90° with respect to the housing part. A quarter turn thus takes place. For the purpose of rotation, the clip part can have an engagement portion for the engagement of a turning tool. The engagement portion can be formed on a second bearing portion of the clip part.

According to a further embodiment, the first latching means of the housing part can comprise two first elastic latching legs which are arranged opposite one another and which latchingly engage behind the opening in the component in the pre-mounting position. The first elastic latching legs can, for example, be attached by both ends to the housing part, that is to say have no free end. For example, they can each be attached by one end to a first bearing portion of the housing part. Their opposite other ends can be connected to one another by a connecting portion. The connecting portion can form the bottom of a cage portion formed by the housing part. Particularly in the case of first latching legs attached by both ends, they can have on the outer side for example a latching compression, for example a latching groove, or a latching projection, which depression or projection latches against the opening in the component in the pre-mounting position. Here, in the course of insertion into the component opening, there at first occurs in each case an elastic deformation of the first latching legs from an inoperative position and an at least partially back-deformation on achieving the latching in the pre-mounting position. Correspondingly, in the course of removal from the component opening on assuming the final-mounting position or during a demounting of the component, there occurs at first an elastic deformation of the first latching legs from an inoperative position and then an at least partial back-deformation.

According to a further embodiment, the second latching means of the clip part can comprise two second elastic latching legs which are arranged opposite one another and which latchingly engage behind the opening in the carrier component in the final-mounting position. The second elastic latching legs can each be attached by one end to the clip part, for example an insertion portion. Their other end can be free in each case. At their free end, the second latching legs can each have one or more latching steps which latchingly engage behind the carrier component opening in the final-mounting position. For example, starting from an attachment to an insertion portion of the clip part, the second elastic latching legs can each extend in the demounting direction in the direction of their free end. There then occurs again an elastic deformation from an inoperative position and a latching engagement behind the opening in the carrier component in the course of assuming the final-mounting position.

According to a further embodiment, there can be provision that in each case a first elastic latching leg of the housing part and a second elastic latching leg of the clip part are arranged in a rotationally offset manner with respect to one another in the locking position of the clip part by the angle of rotation of the clip part between the locking position and the unlocking position and have no rotational offset with respect to one another in the unlocking position. In the locking position, the first latching legs and the second latching legs are rotationally offset in pairs by the angle of rotation by which the clip part is rotated between the locking position and the unlocking position. This angle is preferably 90°. In the unlocking position, this rotational offset is no longer present. Consequently, the cross section formed by the first and second elastic latching legs is reduced during a rotation from the locking position into the unlocking position, with the result that, in the unlocking position, the device can be pulled out of the opening in the carrier component, in particular without elastic deformation of the second latching legs. For example, the second elastic latching legs can be concealed in the unlocking position by the first elastic latching legs, that is to say be arranged behind them on the inner side.

According to a further embodiment, it is possible that the second latching means of the clip part do not latch against the opening in the component in the pre-mounting position. It is also possible that the first latching means of the housing part do not latch against the opening in the carrier component in the final-mounting position. The aforementioned embodiments further facilitate mounting and demounting. The nonoccurring latching of the second latching means against the opening in the component in the pre-mounting position can be achieved for example by a suitable offset between the first and second latching means in the direction of insertion of the device into the opening in the component. The nonoccurring latching of the first latching means against the opening in the carrier component in the final-mounting position can be achieved for example by a correspondingly larger cross section of the opening in the carrier component by comparison with the opening in the component.

According to a further embodiment, there can be provision that the housing part has a first bearing portion which, in the final-mounting position, bears against the component from a side facing away from the carrier component, and that the clip part has a second bearing portion which, in the final-mounting position, bears against the bearing portion of the housing part. The first and/or second bearing portion can be formed by a bearing flange. The first bearing portion has a through-hole which forms the insertion opening for introducing the clip part into the housing part. The second bearing portion can, as already explained, have an engagement portion for a turning tool.

According to a further embodiment, the first bearing portion of the housing part can have a circumferential sealing lip which, in the final-mounting position, bears, on the one hand, sealingly against the component and, on the other hand, sealingly against the second bearing portion of the clip part. The sealing lip then forms a so-called double sealing lip. It provides sealing, on the one hand, with respect to the component and, on the other hand, with respect to the clip part. A particularly good sealing effect with respect to the passage of liquids is thus achieved. For this purpose, the sealing lip can have a V shaped cross section. It can be arranged to extend around on the outer edge of the first bearing portion. The sealing lip is in particular elastic. It can consist of a softer plastic than the remaining portions of the housing part. The housing part can then be produced for example in a two-component injection-molding process.

According to a further embodiment, positioning means can be provided which position the clip part with respect to the housing part in the locking position and in the unlocking position. According to a further embodiment in this respect, there can be provision that the positioning means comprise positioning grooves or positioning ribs, which extend on an inner surface of the housing part in the mounting direction, and positioning ribs or positioning grooves, which extend on an outer surface of the clip part in the mounting direction, wherein the positioning grooves and the positioning ribs are in engagement with one another in the locking position and in the unlocking position. For example, positioning grooves can be provided on an inner surface of the housing part and positioning ribs can be provided on an outer surface of the clip part. However, a converse arrangement is also conceivable. The positioning grooves and positioning ribs are rotationally offset in pairs by the rotational offset between the locking position and the unlocking position, for example by 90°. They latch in the locking position and in the unlocking position, with the latching being releasable by a slight torque. The latching provides the operator with tactile feedback when the locking position or the unlocking position has been reached. Alternatively or in addition, there can also be provided indicating means which visually indicate that the locking position and the unlocking position have been reached. They can be arranged for example on an operator-facing upper side of a second bearing portion of the clip part. They can be formed for example by visual markings.

According to a further embodiment, the device, in the pre-mounting position, can project only slightly beyond the component by way of its end introduced into the opening through the component, in particular by less than 3 mm, preferably by less than 2 mm, for example by approximately 1 mm. This embodiment further facilitates mounting on the carrier component, in particular if little installation space is available between component and carrier component and/or no view is possible.

The invention also relates to a system comprising a carrier component, in particular a vehicle door, and a component, in particular a door module, to be fastened to the carrier component, and comprising a device according to the invention. Here, the system can be situated in the pre-mounting position or in the final-mounting position.

BRIEF DESCRIPTION OF THE DRAWINGS

An exemplary embodiment of the invention will be explained in more detail below with reference to figures, in which schematically:

FIG. 10 shows the device according to the invention in a final-mounting position in an enlarged perspective view, in the form of a detail, from above, FIG. 11 shows the illustration from FIG. 10 in a perspective view from below, FIG. 12 shows the illustration from FIG. 11 with the clip part situated in the unlocking position, and FIG. 13 shows the device according to the invention in a partially demounted state in a perspective view from above.

Unless indicated otherwise, identical reference signs designate identical objects in the figures.

DETAILED DESCRIPTION

Figure 1:
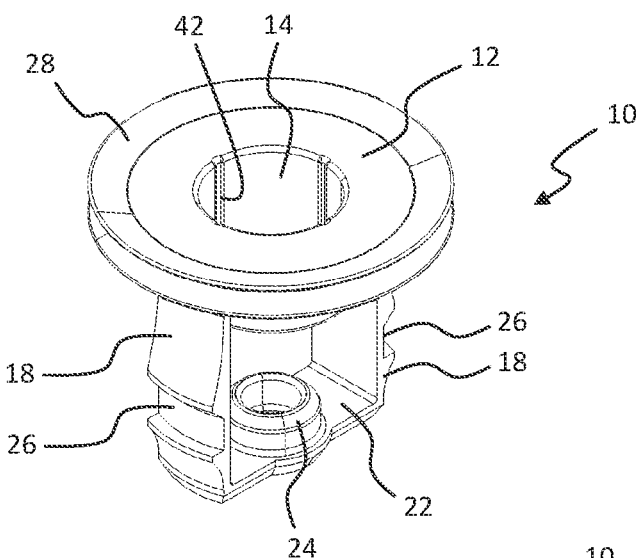
FIG. 1 shows a housing part of a device according to the invention in a first perspective view.
Figure 2:
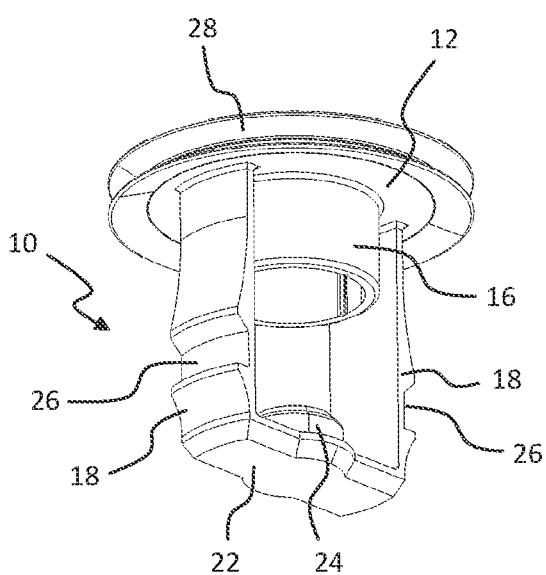
FIG. 2 shows the housing part from FIG. 1 in a second perspective view.
Figure 3:
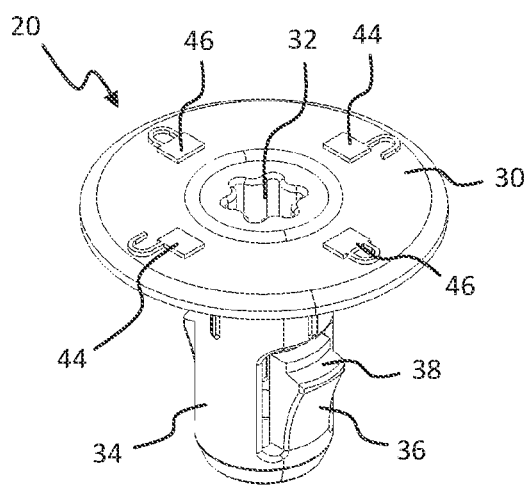
FIG. 3 shows a clip part of the device according to the invention in a first perspective view.
Figure 4:
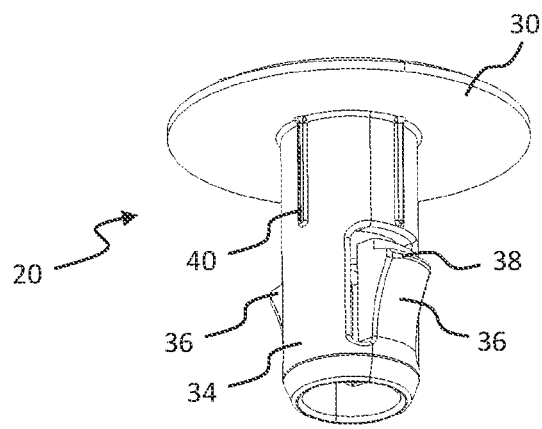
FIG. 4 shows the clip part from FIG. 3 in a second perspective view.

The housing part 10 shown in FIGS. 1 and 2 comprises a first bearing portion 12 in the form of a bearing flange having a central hole 14 which forms an insertion opening for the clip part 20 shown in FIGS. 3 and 4. The hole 14 continues into a hollow cylindrical projection 16. In addition, starting from the first bearing portion 12, two first elastic latching legs 18 arranged opposite one another extend in the direction of insertion of the clip part 20 into the insertion opening 14. Their ends which face away from the first bearing portion 12 are connected to one another via a connecting portion 22 which forms a central hollow cylindrical projection 24. In this way, a cage portion is formed by the housing part 10. The first elastic latching legs 18 have a latching depression 26 on each of their outer sides. In addition, a circumferential elastic sealing lip 28 is arranged on the outer edge of the first bearing portion 12. The sealing lip 28 has a V shaped cross section and consists of a softer material than the remaining constituent parts of the housing part 10. For example, the sealing lip 28 can consist of a softer plastic and the remaining constituent parts of the housing part 10 can consist of a harder plastic. The housing part 10 can then be produced in a two-component injection-molding process.

The clip part 20 shown in FIGS. 3 and 4 has a second bearing portion 30 in the form of a bearing flange which has a central engagement portion 32 for engagement by a turning tool (not represented any more specifically). On the underside of the second bearing portion 30 that faces away from the engagement portion 32, there extends, starting from said bearing portion, a hollow cylindrical insertion portion 34. Two second elastic latching legs 36 arranged opposite one another are attached to a lower (in FIG. 3) end of the insertion portion 34. At their free end opposite to the attachment, the second elastic latching legs 36 in each case have a latching step 38. In addition, a total of four positioning ribs 40 are arranged in a uniformly distributed manner over the circumference of the insertion portion 34 on the outer side of the insertion portion 34. The positioning ribs 40 are thus each rotationally offset with respect to one another by an angle of 90°. Corresponding positioning grooves 42 are likewise formed in a uniformly distributed manner over the circumference on the inner side of the hollow cylindrical projection 16 of the housing part 10. The positioning grooves 42 are thus each likewise rotationally offset with respect to one another by an angle of 90°. Moreover, visual markings 44, 46 are formed on the upper side of the second bearing portion 30 of the clip part 20. They indicate a locking position and an unlocking position of the clip part 20. The clip part 20 can likewise consist of a plastic, produced for example in a plastic injection-molding process.

Figure 5:
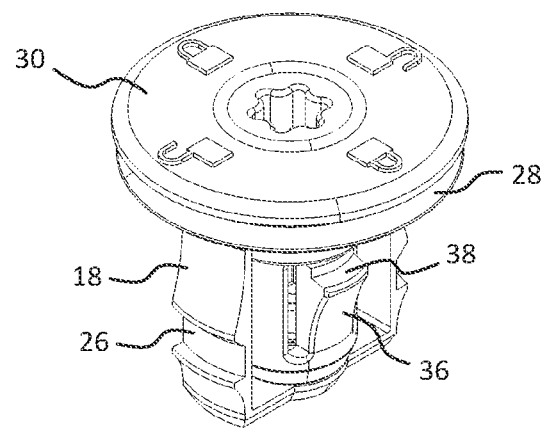
FIG. 5 shows the device according to the invention prior to the mounting on a component in a perspective view.
Figure 5:
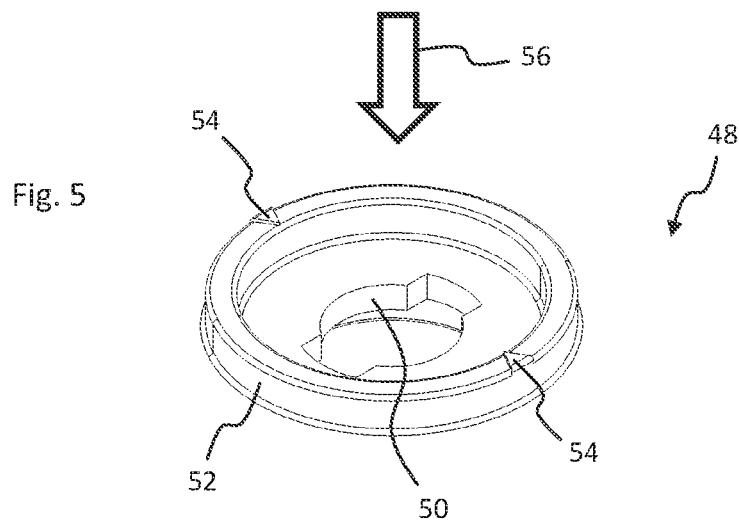

The clip part 20 can, in the rotational orientation illustrated in FIG. 5, be inserted by its insertion portion 34 through the insertion opening 14 and the hollow cylindrical projection 16 into the housing part 10. Here, the hollow cylindrical projection 16 serves to guide the insertion portion 34 which, in the completely inserted state, comes into engagement with the hollow cylindrical projection 24 on the underside of the cage portion of the housing part 10. Here, the positioning ribs 40 also come into releasable engagement with the positioning grooves 42. The relative rotational position between clip part 20 and housing part 10 that is shown in FIG. 5 corresponds to the locking position of the clip part 20. As can be seen in particular in FIG. 5, the first latching legs 18 of the housing part 10 and the second latching legs 36 of the clip part 20 have a rotational offset of 90° with respect to one another in pairs in this locking position. It can also be seen in FIG. 5 that, in this state of the clip part 20 in which it is inserted into the housing part 10, the second bearing portion 30 of the clip part 20 bears sealingly against the upper side of the sealing lip 28. In this way, the sealing lip 28 provides sealing with respect to the clip part 20. The state of the device according to the invention as shown in FIG. 5 can be the delivery state to the assembly site. In order to prevent a situation in which the clip part 20 here is released in an undesired manner from the housing part 10, it can be retained in the housing part 10 with a slight retaining force. This can be achieved in a variety of ways. For example, a slight press fit could be present between the hollow cylindrical projection 24 of the housing part 10 and the free end of the insertion portion 34.

In the state shown in FIG. 5, the device according to the invention can be pre-mounted on a component 48, which is shown only in the form of a detail in FIG. 5. The component 48 can be better seen in FIG. 6. The component 48 can be a door module, for example. It has a fastening portion, which can be seen in FIG. 5, for the device according to the invention with an opening 50 which is keyhole-shaped in the example shown. The fastening portion has a hollow cylindrical wall portion 52 whose inner surface corresponds to the outer surface formed by the sealing lip 28 or the second bearing portion 30. FIG. 5 also depicts visual markings designated by the reference sign 54.

Figure 6:
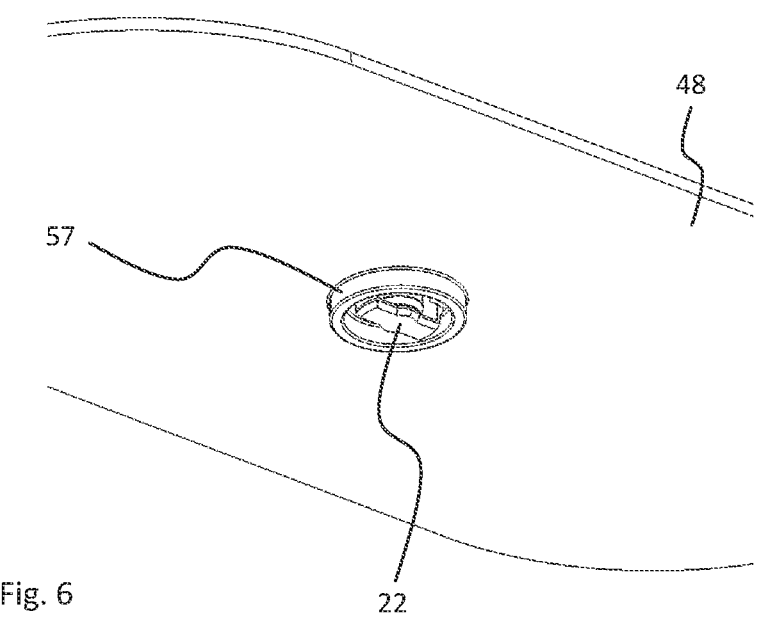
FIG. 6 shows the device according to the invention in a pre-mounting position in a perspective view from below.
Figure 7:
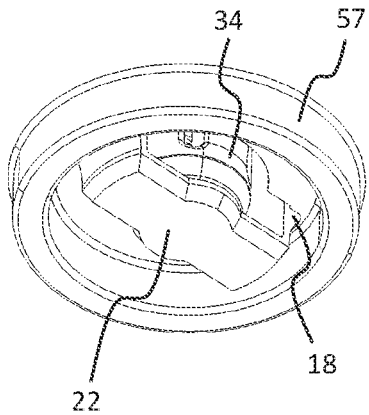
FIG. 7 shows an enlargement, in the form of a detail, of the illustration from FIG. 6.
Figure 8:
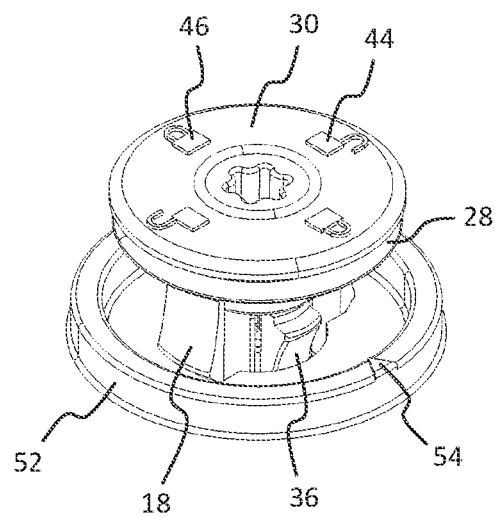
FIG. 8 shows the illustration from FIG. 7 in a perspective view from above.

If the device according to the invention is inserted along the linear mounting direction, which is illustrated in FIG. 5 by the arrow 56, into the opening 50, there first occurs a latching of the first elastic latching legs 18 against the opening 50. In particular, the edge of the opening 50 comes into latching engagement with the latching depressions 26 with elastic deformation of the first elastic latching legs 18. This pre-mounting position is shown in FIGS. 6 to 8. Here, FIGS. 7 and 8 show only the fastening portion of the component 48 for reasons of clarity. It can be seen that the second elastic latching legs 36 of the clip part 20 do not latch against the opening 50 in the component 48 in the pre-mounting position. It can also be seen in particular in FIGS. 6 and 7 that the component 48 also has a hollow cylindrical wall portion 57 on its underside which can be seen in FIGS. 6 and 7 and that the device according to the invention projects only slightly beyond this wall portion 57, for example by only 1 mm.

It can also be seen in FIG. 8 that the second elastic latching legs 36 do not latch against the opening 50 in the component 48 in the pre-mounting position. It can additionally be seen in FIG. 8 that, in the locking position of the clip part 20, the markings 46 indicating a locking are aligned with the markings 54 of the component 48. They thus indicate that the clip part 20 is in the locking position.

Figure 9:
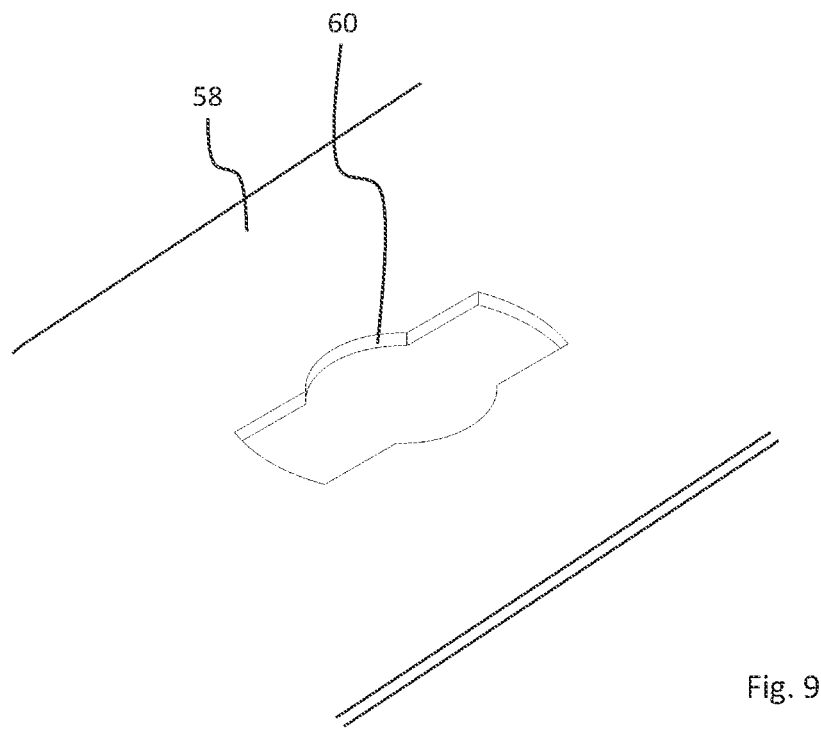
FIG. 9 shows a detail of a carrier component in a perspective view.

FIG. 9 shows, in the form of a detail, a carrier component 58 to which the component 48 is intended to be fastened. The carrier component 58 can be a vehicle door, for example. The carrier component 58 likewise has a keyhole-shaped opening 60 whose cross section, however, is larger than the cross section of the keyhole-shaped opening 50 in the component 48. In particular, the opening 60 of the carrier component 58 has a greater length than the opening 50 of the component 48. Moreover, the opening 60, just like the opening 50, is adapted to the cross section of the device to be inserted into the opening 60 or 50.

In the pre-mounted state shown in FIGS. 6 to 8, the component 48 together with the device according to the invention can be moved toward the opening 60 in the carrier component and aligned with said component. Then, to achieve the final-mounting position, it is possible, by further pressing-in in the direction of the mounting direction 56, for the device to be pressed further into the opening 50 in the component 48 and into the opening 60 in the carrier component 58. Here, the first elastic latching legs 18 first come out of engagement with the opening 50 in the component 48 under elastic deformation. At the same time, the length of the opening 60 in the carrier component 58 is large enough such that the first elastic latching legs 18 can be guided through the opening 60 without elastic deformation and do not latch against the opening 60 in the final-mounting position. However, in the final-mounting position, the second elastic latching legs 36 latch by way of their latching steps 38 against the opening 60 in the carrier component 58, as can be seen in particular in FIG. 11. It can be seen in FIG. 10 that the second bearing portion 30 of the clip part 20 is received, together with the sealing lip 28 of the housing part 10, in the wall portion 52 of the component 48. Here, the sealing lip 28 bears sealingly against the component 48 such that it also ensures sealing with respect to the component 48. In this final-mounting position, the component 48 is retained securely on the carrier component 58 by the device according to the invention. In FIGS. 10 to 13, the component 48 and the carrier component 58 are again shown only in the form of a detail.

In order to demount the component 48 with the device according to the invention from the carrier component 58, the clip part 20 is rotated by 90° with respect to the housing part 10 from the locking position into an unlocking position. Here, the geometry of the opening 60 in the carrier component 58 prevents the housing part 10 from rotating as well. The rotation can occur by means of a turning tool which engages in the engagement portion 32. This state of the device is shown in FIG. 12. It can be seen here that the previously existing rotational offset of 90° between the first elastic latching legs 18 and the second elastic latching legs 36 no longer exists. Rather, the cylindrical outer surface of the insertion portion 34 now forms the cross-sectional width of the device. The cross section of the device is reduced in this width with respect to FIG. 11. In particular, the second elastic latching legs 36 are received in the cage portion formed by the first elastic latching legs 18 in such a way that they are concealed by the first elastic latching legs 18, that is to say are situated behind them on the inner side. The device can now be pulled out again from the opening 60 in the carrier component 58 by exerting a linear pulling force in the direction of a demounting direction opposed to the mounting direction 56. The component 48 is thus demounted from the carrier component 58. In the course of this demounting, the device is also pulled partially out of the opening 50 in the component 48 again back into the position shown in FIG. 13 in which the first elastic latching legs 18 again latch against the opening 50 in the component 48. This state differs from the pre-mounting position shown in FIGS. 6 to 8 only in that the clip part 20 is now situated in the unlocking position. This is indicated by the markings 44 of the clip part 20 which are now aligned with the markings 54 of the component 48. Should a demounting of the device from the component 48 also be desired, the device can be pulled out of the opening 50 in the component 48 by exerting a further pulling force along the demounting direction, again with elastic deformation of the first elastic latching legs 18.

LIST OF REFERENCE SIGNS

10 Housing part
12 First bearing portion
14 Hole
16 Hollow cylindrical projection
18 First elastic latching legs
20 Clip part
22 Connecting portion
24 Hollow cylindrical projection
26 Latching depression
28 Sealing lip
30 Second bearing portion
32 Engagement portion
34 Insertion portion
36 Second elastic latching legs
38 Latching step
40 Positioning ribs
42 Positioning grooves
44 Markings
46 Markings
48 Component
50 Opening
52 Wall portion
54 Markings
56 Arrow/mounting direction
57 Wall portion
58 Carrier component
60 Opening

What is claimed is:

1. A system, comprising: a component (48), a carrier component (58), and a device for fastening the component (48) to the carrier component (58), wherein the device comprises a housing part (10) and a clip part (20) that is inserted into the housing part (10) in a linear mounting direction, wherein the housing part (10) has first latching means, and wherein the clip part (20) has second latching means, wherein the clip part (20) is received in the housing part (10) so as to be rotatable between a locking position and an unlocking position, wherein the first latching means of the housing part (10), with the clip part (20) received in the locking position, is configured to establish a pre-mounting position in which the housing part (10) is partially inserted into an opening (50) in the component (48), in which pre-mounting position the first latching means of the housing part (10) latch against the opening (50) in the component (48), wherein the second latching means of the clip part (20), with the clip part (20) received in the locking position, is configured to establish a final-mounting position in which the housing part (10) is completely inserted into the opening (50) in the component (48) and into an opening (60) in the carrier component (58), in which final-mounting position the second latching means of the clip part (20) latch against the opening (60) in the carrier component (58), with the result that the device with the component (48) cannot be released from the carrier component (58) as a result of movement in a linear demounting direction opposed to the linear mounting direction (56), and wherein the latching of the second latching means of the clip part (20) against the opening (60) in the carrier component (58) is released in the unlocking position of the clip part (20), with the result that the device with the component (48) is releasable from the carrier component (58) as a result of movement in the linear demounting direction.

2. The system as claimed in claim 1, wherein the clip part (20) is rotatable between the locking position and the unlocking position by 90° with respect to the housing part (10).

3. The system as claimed in claim 1, wherein the first latching means of the housing part (10) comprise two first elastic latching legs (18) which are arranged opposite one another and which latchingly engage behind the opening (50) in the component (48) in the pre-mounting position.

4. The system as claimed in claim 3, wherein the second latching means of the clip part (20) comprise two second elastic latching legs (36) which are arranged opposite one another and which latchingly engage behind the opening (60) in the carrier component (58) in the final-mounting position.

5. The system as claimed in claim 4, wherein in each case a first elastic latching leg (18) of the housing part (10) and a second elastic latching leg (36) of the clip part (20) are arranged in a rotationally offset manner with respect to one another in the locking position of the clip part (20) by the angle of rotation of the clip part (20) between the locking position and the unlocking position and have no rotational offset with respect to one another in the unlocking position.

6. The system as claimed in claim 1, wherein the second latching means of the clip part (20) do not latch against the opening (50) in the component (48) in the pre-mounting position.

7. The system as claimed in claim 6, wherein the first latching means of the housing part (10) do not latch against the opening (60) in the carrier component (58) in the final-mounting position.

8. The system as claimed in claim 1, wherein the housing part (10) has a first bearing portion (12) which, in the final-mounting position, bears against the component (48) from a side facing away from the carrier component (58), and wherein the clip part (20) has a second bearing portion (30) which, in the final-mounting position, bears against the first bearing portion (12) of the housing part (10).

9. The system as claimed in claim 8, wherein the first bearing portion (12) of the housing part (10) has a circumferential sealing lip (28) which, in the final-mounting position, bears, on the one hand, sealingly against the component (48) and, on the other hand, sealingly against the second bearing portion (30) of the clip part (20).

10. The system as claimed in claim 1, wherein positioning means are provided which position the clip part (20) with respect to the housing part (10) in the locking position and in the unlocking position.

11. The system as claimed in claim 10, wherein the positioning means comprise positioning grooves (42) or positioning ribs, which extend on an inner surface of the housing part (10) in the mounting direction, and positioning ribs (40) or positioning grooves, which extend on an outer surface of the clip part (20) in the mounting direction, wherein the positioning grooves (42) and the positioning ribs (40) are in engagement with one another in the locking position and in the unlocking position.

12. The system as claimed in claim 1, wherein, in the pre-mounting position, the device projects only slightly beyond the component (48) by way of its end introduced into the opening (50) in the component (48), in particular by less than 3 mm, preferably less than 2 mm.

13. The system as claimed in claim 1, wherein the carrier component (58) is a vehicle door, and the component (48) is a door module, fastened to the vehicle door.

14. A system, comprising: a component (48), a carrier component (58), and a device for fastening the component (48) to the carrier component (58), wherein the device comprises a housing part (10) and a clip part (20) received by the housing part (10) by insertion in a linear mounting direction (56), wherein the housing part (10) has first latching means, and wherein the clip part (20) has second latching means, wherein the clip part (20) is received in the housing part (10) and is rotatable relative to the housing part (10) between a locking position and an unlocking position, wherein the first latching means of the housing part (10), with the clip part (20) in the locking position, is configured to establish a pre-mounting position in which the housing part (10) is partially inserted into an opening (50) in the component (48), in which pre-mounting position the first latching means of the housing part (10) latch against the opening (50) in the component (48), wherein the second latching means of the clip part (2) is configured, with the clip part (20) in the locking position, to establish a final-mounting position in which the housing part (10) is completely inserted into the opening (50) in the component (48) and into an opening (60) in the carrier component (58), in which final-mounting position the second latching means of the clip part (20) latch against the opening (60) in the carrier component (58), such that the device with the component (48) cannot be released from the carrier component (58) as a result of movement in a linear demounting direction opposed to the linear mounting direction (56) unless the clip part (20) is rotated to the unlocking position.

* * * * *